United States Patent [19]
Vance et al.

[11] Patent Number: 5,383,741
[45] Date of Patent: Jan. 24, 1995

[54] END WELDED STUD AND SUPPORTS FOR WIREWAY HANGERS

[75] Inventors: Jack E. Vance, Suffolk, Va.; Gerald J. Luce, deceased, late of Glen Mills, Pa., by Cheryl L. Luce, Gerald J. Luce II, Deborah L. Bizaro, Cynthia A. Luce, executors; Robert L. Adair, Jr., Hagerstown, Md.; Clark B. Champney, Elyria, Ohio

[73] Assignees: Newport News Shipbuilding and Dry Dock Company, Newport News, Va.; TRW Inc., Cleveland, Ohio

[21] Appl. No.: 109,634

[22] Filed: Aug. 20, 1993

Related U.S. Application Data

[63] Continuation of Ser. No. 363,673, Jun. 9, 1989, abandoned.

[51] Int. Cl.6 .......................... F16L 3/00; F16B 11/00
[52] U.S. Cl. ......................... 403/383; 403/189; 403/272; 403/287; 248/58; 248/59; 248/70
[58] Field of Search ............... 248/58, 62, 59, 70; 403/245, 287, 272, 383, 189; 411/171

[56] References Cited

U.S. PATENT DOCUMENTS

| | | |
|---|---|---|
| 2,339,565 | 1/1944 | Goldberg et al. |
| 2,587,150 | 2/1952 | Hansen et al. |
| 3,353,852 | 11/1967 | Wood . |
| 3,355,132 | 11/1967 | Jenkins . |
| 3,506,227 | 4/1970 | Jenkins . |
| 3,517,901 | 6/1970 | Jenkins . |
| 3,528,634 | 9/1970 | Jenkins . |
| 3,556,447 | 1/1971 | Jenkins . |
| 3,657,851 | 4/1972 | Chambers et al. |
| 3,674,233 | 7/1972 | Van Buren, Jr. |
| 3,868,190 | 2/1975 | Moore . |
| 3,891,332 | 6/1975 | Molyneux et al. |
| 4,684,304 | 8/1987 | Franks . |

*Primary Examiner*—Randolph A. Reese
*Assistant Examiner*—Anthony Knight
*Attorney, Agent, or Firm*—Fay, Sharpe, Beall, Fagan, Minnich & McKee

[57] ABSTRACT

A stud for use in end welding and having a cylindrical portion with a welding flux and a square portion. The square portion has planar faces through bores. A wire hanger using the cylindrical and square stud with a support leg are secured to the stud and tiers are secured to the support leg for supporting wires, pipes, ducts or other objects spaced from overhead or a bulkhead.

57 Claims, 2 Drawing Sheets

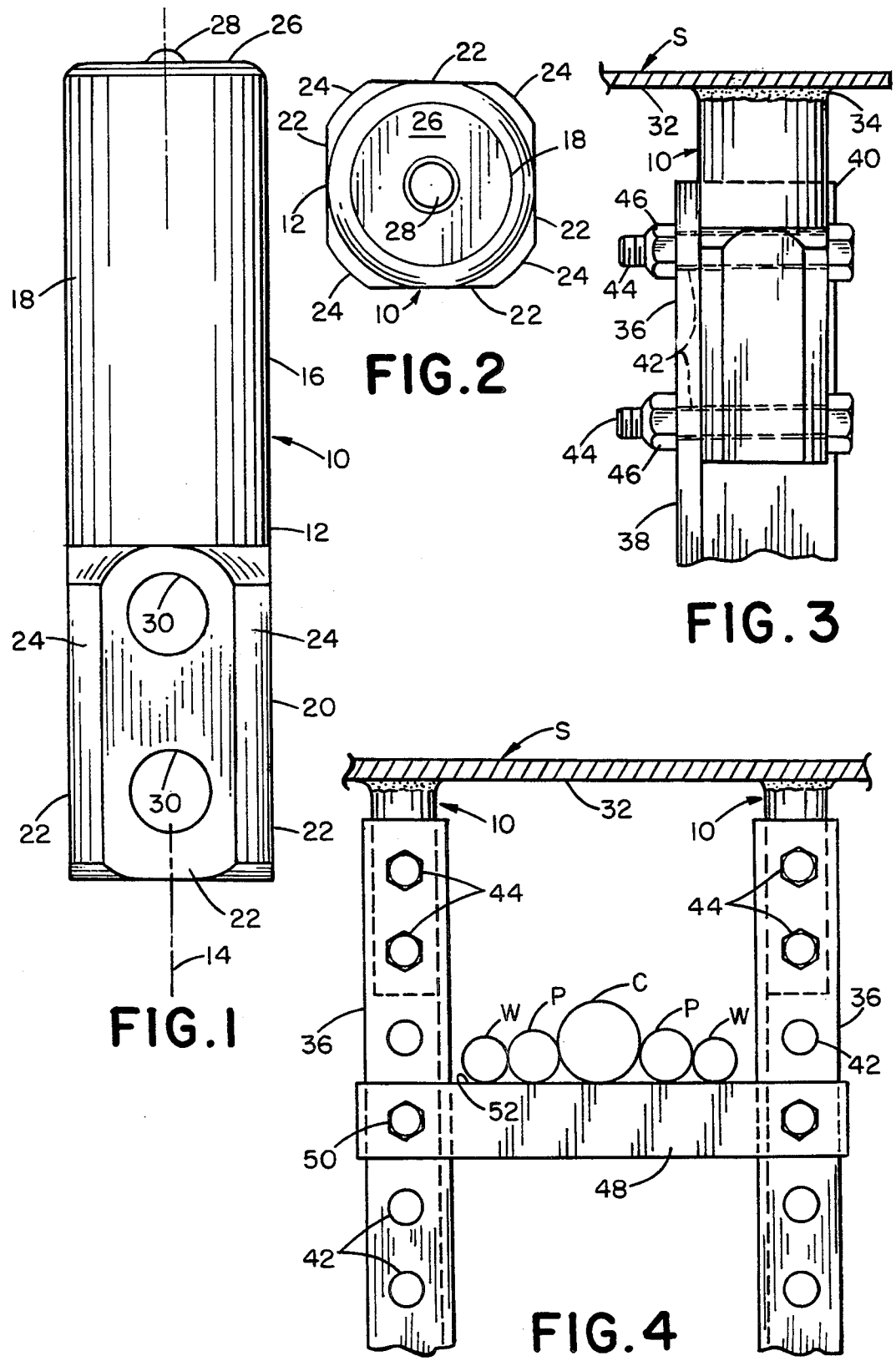

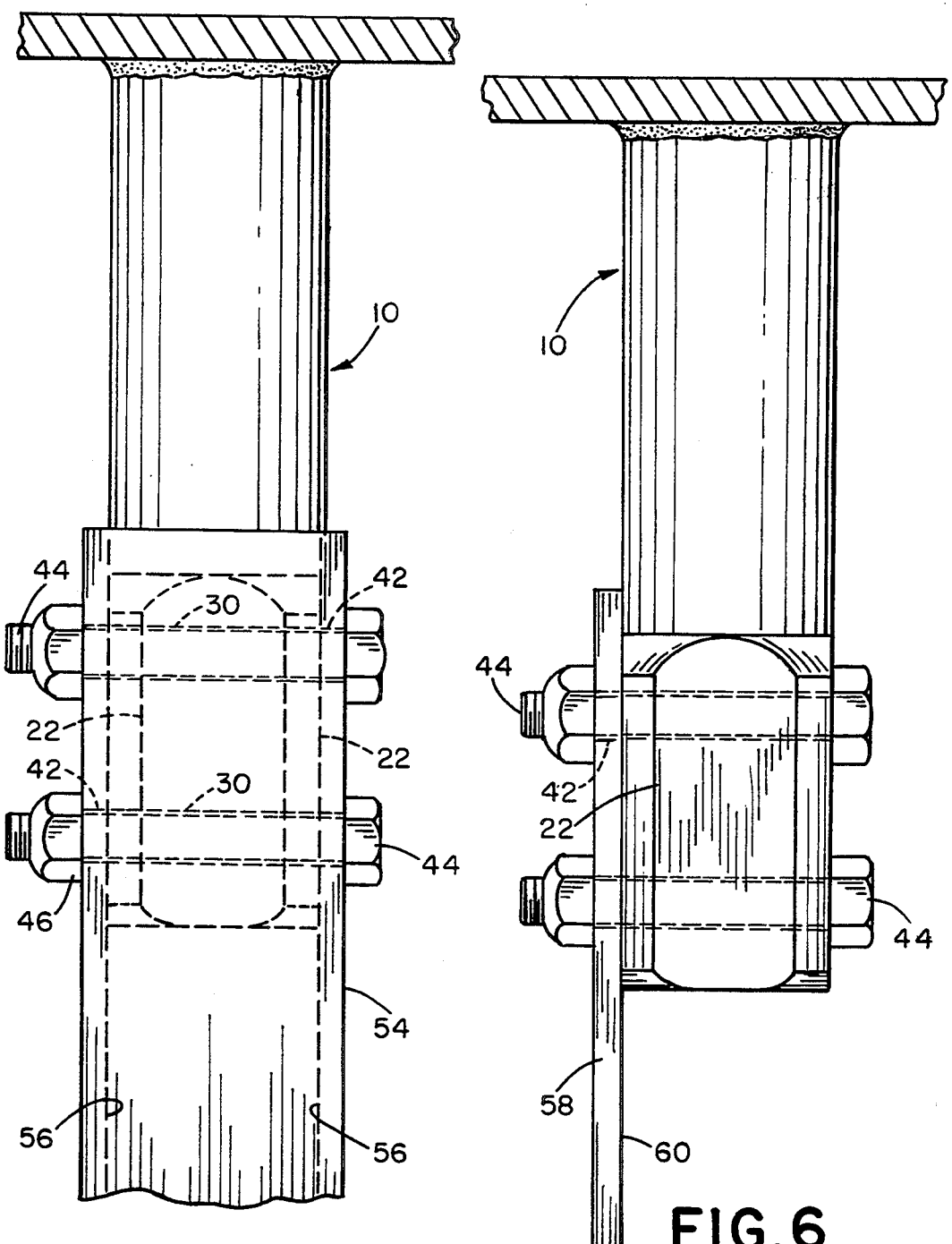

END WELDED STUD AND SUPPORTS FOR WIREWAY HANGERS

This is a continuation of copending application Ser. No. 07/363,673 filed on Jun. 9, 1989, now abandoned.

INTRODUCTION

This invention relates generally to supporting objects spaced from a metal structure and would have many uses in industry. In particular, the present invention relates to both the method and the means for producing support means spaced from a steel overhead, a steel bulkhead or any other metal structure for use in carrying wires or conduits such as ducts, pipes and the like. More particularly, the present invention relates to a method and means for facilitating the construction of supports to an overhead structure for the support of wires, ducts and pipes or other items.

BACKGROUND OF THE INVENTION

Supporting wireway hangers on board ship is old and well known. Forming such support often included the attaching of a bar or square tubing to a metal structure that may be an overhead or a bulkhead. Typically, the wireway hangers found on most ships are hung from the steel overhead at the ends of two lengths of bar or square tubing. The bar or tubing forms the support leg for the hanger that has horizontal tiers consisting of bars or rods fastened to the support legs for contact support with the wires or cables that are to be secured spaced from but close to the overhead. The same method could be utilized to secure pipes, ducts or items such as switchboards to the bulkhead or overhead or deck below.

In the typical conventional application for construction of wireway hangers, the bar or tubing used will form the support leg for the tiers. The bar or tubing is secured to the overhead or bulkhead or other metal structure by welding. The weld for securing the bar or tubing is typically a tack weld at a couple of points around the circumference of the bar or tubing, or possibly a complete parametric fillet weld. Usually this method requires one person to hold the lengths of bar or tubing to the overhead with tiers attached or with a special jig while a welder tacks the bar or tubing to the metal structure. The jig supports the two lengths of bar or tubing to ensure that they are positioned correctly. The jig is then removed and, if necessary, the welds are completed. Tack welds and fillet welds are made by manual welding. If the overhead is of a special material, for example, high yield steel, special welding procedures must be followed, which may be very cumbersome and time consuming requiring specially qualified welders and lengthy inspections and auditing steps. Most metal structures require heating prior to welding and this can be very expensive.

Once the vertical legs are secured to the overhead or bulkhead or other metal structure, cross pieces or tiers can be secured to these vertical legs by any appropriate means. It is these cross pieces or tiers that support the wires or cables. A series of such supports is called a wireway for the holding of wire or cable. Whether the objects to be secured to the overhead or bulkhead are wires, pipes, conduits or other ducts is not important because they have the common requirement of a secure fixed location spaced from the overhead, bulkhead or other metal structure.

In certain shipbuilding operations, it may be required to move the wireway support at a later date. This operation requires that the bar or tubing used to form legs will have to be cut from the overhead and the welds that previously held such legs to the metal structure would have to be ground until smooth at the surface of the metal structure. Should the overhead or bulkhead be of a special metallic material, cumbersome weld repair, inspection and auditing steps may again be required adding substantially to the cost of the procedure.

It is proposed with this invention to substitute a stud weld for the manual weld. While variously shaped studs have been utilized in the past in welding using a stud gun, the shape of the stud base for the end weld has been found to be important for the stability of the weld as well as the ease of achieving the weld. The round shape of the end being welded to the metal structure has been found to be the most stable and most desirable shape for the end weld. The round or cylindrical shape of the stud, however, is not found desirable for supporting a leg upon which a tier is to be mounted for construction of a wire hanger. Additionally, the prior art studs would not have bores on planar surfaces that enable a support leg to be bolted to the installed stud.

The known prior art does not disclose the combination of a round and square stud having bores for placement of a support leg. For instance, Jenkins U.S. Pat. No. 3,506,227 discloses either a round threaded stud or a simple flat bar stud neither of which would serve the purposes of the present invention. Neither flat bar nor angle bar nor square tubing can easily be attached to a threaded stud. The rectangular surface connection for the flat bar stud would not be a secure weld and could not be utilized to achieve the secure fastening of the stud of the present invention. Moreover, such a flat bar stud is stiff in only one direction.

The patent to Logan U.S. Pat. No. 3,279,517 discloses a welding stud for attachment to convex surfaces and does not disclose the stud nor the purposes to which the present invention is directed.

Jenkins U.S. Pat. No. 3,517,901 discloses a pipe hanger using a stud having a rectangular cross section that would not provide the stable fastening of the present invention.

Rondeau U.S. Pat. No. 3,760,143 shows an alternative welding stud unlike the welding stud of the present invention.

OBJECTS OF THE INVENTION

The present invention has for a principal object the provision of a method and means for attaching a hanger to a bulkhead or overhead or other metal structure to form a support for pipes, wires, ducts or other conduits.

A more particular object of the present invention is the provision of method and means for forming a secure attachment of a wireway hanger to an overhead structure particularly on board ship that will be stable and yet be removable when required.

Another object of the present invention is to provide a method and means for securing wires, pipes, ducts or other items at a distance from a metal structure to achieve a standoff as desired.

Another and particular object of the present invention is the provision of a particular stud for use in a stud gun that provides an effective and efficient secure attachment to a metal surface such as an overhead or bulkhead of a ship and which permits the attachment of a support leg for securing thereon a tier for carrying wires, pipes, ducts or other conduits.

These and other objects of the present invention become more apparent upon review of the specification and the drawings which include the following.

THE DRAWINGS

FIG. 1 is a plan view of a stud having a cylindrical base and a substantially square opposite end with a plurality of bores passing therethrough perpendicularly to the axis of the stud.

FIG. 2 is a top view of the stud of FIG. 1 showing the welding flux located within the circular base and also showing the chamfered edges on the square cross section portion at the other end of the stud.

FIG. 3 is an elevational view in cross section and partly broken away illustrating the installation of the stud of FIG. 1 into a metal structure and illustrating the securing of a steel angle to the planar surfaces of the square portion of the stud by bolting.

FIG. 4 is an elevational view partly broken away of a pair of studs as shown in FIG. 1 and a pair of steel angle support legs as shown in FIG. 3 mated to the planar surfaces of the square cross section portion of the stud and bolted in a secure position along with a cross bar or tier forming a wireway to support the wires or cables shown.

FIG. 5 is an elevational view partly in cross section and broken away illustrating the stud of FIG. 1 secured to a metal structure and as an alternate embodiment, a tubular support leg having inside surfaces mating with the planar surfaces of the square portion of the stud and secured together by bolting.

FIG. 6 is an alternate embodiment similar to that of FIG. 5 illustrating only a flat bar secured to the stud of FIG. 1 at a planar surface on one side and secured by bolting.

SUMMARY OF THE INVENTION

A stud for use in stud or end welding and having the structure of an elongated bar with a central axis and an outer surface, and is provided with a first portion having a cylindrical surface and a second portion having at least a planar surface parallel to the central axis. The stud is provided with a round base at the end of the cylindrical surface and has a welding flux positioned thereon. The planar surface is provided with a plurality of bores perpendicular to the central axis for receiving a steel angle, a tubular member or flat bar as a support leg.

A hanger for use in securing wires, conduits, ducts and the like in a spaced relationship from a metal surface such as an overhead or bulkhead includes the stud described above in addition to a support leg that may be a steel angle, a tubular member or flat bar having mating surfaces corresponding to the planar surface on the stud. The support leg is provided with openings that correspond with the bores in the stud. Cross members in the form of tiers are secured as by bolting to the support leg to provide a support for the wires, pipes, ducts or the like.

DESCRIPTION OF THE PREFERRED EMBODIMENTS

As shown in FIGS. 1 and 2 of the drawings, the stud of the present invention is generally depicted at 10 and is typically in the form of an elongated bar 12 that is made of steel or other metal that would be weldable.

The stud 10 is provided with a central axis 14 passing through the length of the stud. The stud is provided with an outer surface 16 that has a first portion shaped in the form of a cylinder 18. A second portion of the outer surface of the stud 10 is in the form of a square in cross section as shown at 20 and also shown in FIG. 2. The diameter of the cylinder is substantially the same as the width of the square cross section as shown, but may be different if desired.

The substantially square cross section 20 is provided integrally with the cylindrical surface along the stud 10 and may extend for any part of the length of the stud. As shown in FIG. 1, the square cross sectional portion 20 is slightly less than half the length of the stud, e.g., one-third to one-half the length of the stud as shown in FIG. 1, and is provided with at least one planar surface as shown in FIG. 1 at 22 that is parallel to the central axis 14. In FIG. 2, the substantially square cross section 20 is shown to have four planar sides, each shown at 22.

Preferably, the edges 24 of the substantially square portion 20 are chamfered as shown at 24 of FIG. 2. The base 26 at the cylindrical end of the stud 10 is flat and circular to receive a welding flux 28.

Alternatively, the stud may have only one, two or three planar surfaces 22. Where two such planar surfaces abut, the edges may be chamfered as shown at 24.

The welding flux may be embedded into the surface of the base 26 in the conventional manner. The particular type of welding flux will vary in accordance with the type of steel forming the stud as well as the material of the structure S forming the overhead or bulkhead or other metal structure. Typical welding fluxes for end welding of studs are given in the *Welding Handbook*, Seventh Edition, 1978.

An important facet of the present invention is that the planar surfaces 22 of the stud 10 are provided with at least one but preferably a plurality of bores 30 that may be threaded if desired. The bores are perpendicular to the central axis 14 and the planar faces 22.

The stud 10 is to be end welded into the metal surface of the metal structure S which represents a steel overhead or bulkhead or any other type structure usually on board ship. The end welding is accomplished by a conventional stud gun, not shown.

Stud welding of the stud as by an arc welding stud gun is well known in the art and forms no part of the present invention. The term "stud welding" as used herein should be interpreted as generally encompassing all methods of end welding of a stud. It is preferable, however, that an arc stud welding gun be utilized because of the ease with which a firmly welded stud can be achieved. The stud gun, of conventional design, is loaded to hold the stud in the gun with the cylindrical portion of the stud facing outwardly and with the welding flux 28 being the leading edge facing towards the faying surface 32 of the metal structure S.

The stud gun creates a dc arc between the end of the stud 10 at the base 26 and the faying surface 32 of the metal structure S to form a weld pool into which the gun projects the stud with the welding flux 28. The entire operation is conventionally done automatically without control by the operator except by actuation of the gun. The result of the stud arc weld as shown in FIG. 3 typically produces an end weld with some weld bulge 34 surrounding the stud 10 at the joining of the stud with the metal surface S.

It should be understood that while the stud is preferably welded to the metal surface S by means of a stud gun, it is possible, though a much less desirable alternative, to utilize typical fillet welds or other means of attachment that would be stable. However, the special preparation, inspection and auditing necessary for fillet welding are eliminated in stud welding. A jig may still be desirable for locating the studs, but is much simpler and less cumbersome than with prior methods. All that is required is merely a length of stock notched at one end to fit the previously welded stud and formed at the other end with means to locate the stud gun at the proper spacing.

Once the stud has been welded in place as shown in FIG. 3, a support leg, in this case a steel angle 36, may be secured to the stud 10. The steel angle is L-shaped having legs 38 and 40 forming a right angle in a conventional manner. Both legs 38 and 40 may be received on corresponding planar surfaces 22 as shown in FIG. 3. Since the inside of the steel angle 36 always has some radius resulting from the manufacturing process, the chamfer 24 on the stud allows both legs 38 and 40 of the steel angle 36 to fit flush against the mating planar surfaces 22 of the stud. This is important as it provides a strong, stable joint between the stud 10 and the steel angle 36.

The leg 38 is provided with openings 42 that are spaced along the face 38 to the extent and in a size to correspond approximately to the bores 30 in the stud 10. As shown in FIG. 3 and in FIG. 4, the angle 36 is secured up against the planar surface 22 on two sides of the stud 10 and conventional bolts 44 may be passed therethrough. If the bores 30 are not threaded, a conventional nut 46 may be received on the end of the bolt 44 and tightened to secure the angle to the stud and form a secure support leg.

When the steel angle 36 is secured to the stud as shown in FIG. 3, the installation of a second stud may be achieved as mentioned above utilizing a jig if desired so that a second stud is positioned on the metal surface S as shown in FIG. 4. The same procedure is repeated with a steel angle 36 being secured to the second stud and bolted with bolts 44 to form with the pair of depending steel angles 36, a pair of sturdy and securely positioned support legs for mounting of the cross bar or tier 48.

The cross bar or tier 48 may be a length of square tubing or angle or channel that is provided with apertures 50 on each end of the tier 48 that correspond to the spacing between the adjacent combined stud and support legs and are of a size corresponding to the openings 42 on the steel angle 36.

When installed, the tier 48 may be raised or lowered to maintain a desired spacing from the steel surface S. The top 52 of the tier may be of any thickness or depth as desired and formed from any material to provide a surface for supporting the ducts or other conduits C, or the wires W, or pipes P as shown in FIG. 4. Of course it is not necessary and may not be desirable to include the wires, pipes and conduits or ducts in the same hanger but it is possible to do so. For ultimate use a series of the hangers shown in FIG. 4 is formed along the bulkhead or overhead shown as the metal structure S.

When and if the wireway must be removed from the overhead for reconstruction purposes or other reasons, it is a simple procedure to simply unbolt the support leg 36 from the stud 10. The stud may be removed by applying hammer blows perpendicular to the central axis 14. Upon removal of the stud the remaining weld bulge 34 may be ground until smooth.

In FIGS. 5 and 6 alternative support legs are shown. The structure shown in FIG. 5 is a square tubing member 54 having internal surfaces 56 that conform to the planar surfaces 22 on the square cross section portion of stud 10. The tubular member 54 has similar openings 42 that correspond to the bores 30 in the stud 10. The advantage of utilizing a tubular member 54 is that there is a more secure connection in that the various internal surfaces 56 all mate and correspond with their respective planar surfaces 22 on the stud so that there is substantially no movement possible between the stud and the tubular member except longitudinally until the bolt 44 is inserted through the opening 42 and through bore 30 as shown in FIG. 5 whereupon nut 46 may be applied to secure the tubular member 56 to the stud unless the bore 30 has been threaded.

The other embodiment of the present invention is shown in FIG. 6 and is similar to that previously disclosed except that the support leg is in the form of a flat bar 58 that has a flat face 60 adapted to mate precisely with the planar surface 22 of the stud 10. Similar to that previously described with the angle 36 and the tubular member 54, the flat bar 58 forming the support leg of the modification of FIG. 6 is provided with openings 42. These openings 42 coincide with the bores 30 on the planar surface 22 of the stud and receive the bolts 44 and the nut 46 to secure the flat bar to the stud 10.

The method described within the present disclosure includes the means and steps for supporting objects spaced from a metal structure. This assortment of objects could be the wires, pipes or ducts or other conduits spaced from an overhead or a bulkhead of a ship. While it is preferable that a series of such wire hangers form the supports for a run of wire, cable, pipes, ducts or the like it is possible that each support may consist of only one support leg rather than two supporting legs. A single support leg could be used to support wires or ducts or pipes or other items.

The method shown could also be used to support such items as switchboards or racks from bulkheads or other surfaces. The item could be attached to the support leg 36 in the same manner as the cross piece 48 is attached to it in FIG. 4.

Other variations are possible. For example, stud 10 may be bent instead of straight in order to mount support leg 36 at an angle to surface 32 if desired.

It is believed that the foregoing has described in clear and precise terms the invention sought to be patented and has met the objects of the invention as previously expressed. The scope of the invention is limited solely by the following claims wherein:

I claim:

1. A stud for use in stud welding comprising:
    an elongated bar, having a central axis and an outer surface,
    said outer surface of said bar having a first portion being a substantially cylindrical surface and a second portion of said outer surface spaced from said first portion having at least one planar surface extending parallel to said central axis,
    said stud having a base formed at the end of said cylindrical surface,
    said base having a welding flux thereon, and
    said planar surface having a plurality of bores perpendicular to said central axis.

2. The stud of claim 1 including, said second portion of said outer surface having at least two of said planar surfaces, said planar surfaces being mutually perpendicular.

3. The stud of claim 2 including,
said planar surfaces including therebetween a chamfered edge extending along said planar surfaces.

4. The stud of claim 1 including,
said base being substantially flat around said flux.

5. The stud of claim 1 including,
said second portion of said outer surface being substantially a square in cross-section.

6. The stud of claim 5 including,
said substantially square shape having chamfered corners.

7. The stud of claim 1 including,
said second portion of said outer surface having at least two of said planar surfaces, said planar surfaces being mutually perpendicular,
said planar surfaces including therebetween a chamfered edge extending along said planar surfaces, and
said second portion of said outer surface being substantially a square in cross-section.

8. The stud of claim 1 including,
said second portion of said outer surface having at least two of said planar surfaces, said planar surfaces being mutually perpendicular,
said planar surfaces including therebetween a chamfered edge extending along said planar surfaces,
said second portion of said outer surface being substantially a square in cross-section, and
said base being substantially flat around said flux.

9. The stud of claim 1 including,
the width of the cross-section of said second portion of said outer surface being substantially equal to the diameter of said base.

10. The stud of claim 1 including,
said second portion of said outer surface being substantially a square in cross-section, and
the width of said square being substantially equal to the diameter of said base.

11. The stud of claim 1 including,
said second portion of said outer surface having at least two of said planar surfaces, said planar surfaces being mutually perpendicular,
said planar surfaces including therebetween a chamfered edge extending along said planar surfaces,
said second portion of said outer surface being substantially a square in cross-section, and
the width of said square being substantially equal to the diameter of said base.

12. A hanger comprising,
an elongated bar, forming a stud and having a central axis and an outer surface,
said outer surface of said bar having a first portion being a substantially cylindrical surface and a second portion of said outer surface spaced from said first portion having at least one planar surface extending parallel to said central axis,
said stud having a base formed at the end of said cylindrical surface,
said base having a welding flux thereon,
said planar surface having a plurality of bores perpendicular to said central axis, and
a support leg secured to said stud at said planar surface.

13. The hanger of claim 12 including,
said second portion of said outer surface having at least two of said planar surfaces, said planar surfaces being mutually perpendicular.

14. The hanger of claim 13 including,
said planar surfaces including therebetween a chamfered edge extending along said planar surfaces.

15. The hanger of claim 12 including,
said base being substantially flat around said flux.

16. The hanger of claim 12 including,
said second portion of said outer surface being substantially a square in cross-section.

17. The hanger of claim 16 including,
said substantially square shape having chamfered corners.

18. The hanger of claim 12 including,
said second portion of said outer surface having at least two of said planar surfaces, said planar surfaces being mutually perpendicular,
said planar surfaces including therebetween a chamfered edge extending along said planar surfaces, and
said second portion of said outer surface being substantially a square in cross-section.

19. The hanger of claim 12 including,
said second portion of said outer surface having at least two of said planar surfaces, said planar surfaces being mutually perpendicular,
said planar surfaces including therebetween a chamfered edge extending along said planar surfaces,
said second portion of said outer surface being substantially a square in cross-section, and
said base being substantially flat around said flux.

20. The hanger of claim 12 including,
the width of the cross-section of said second portion of said outer surface being substantially equal to the diameter of said base.

21. The hanger of claim 12 including,
said second portion of said outer surface being substantially a square in cross-section, and
the width of said square being substantially equal to the diameter of said base.

22. The hanger of claim 12 including,
said second portion of said outer surface having at least two of said planar surfaces, said planar surfaces being mutually perpendicular,
said planar surfaces including therebetween a chamfered edge extending along said planar surfaces,
said second portion of said outer surface being substantially a square in cross-section, and
the width of said square being substantially equal to the diameter of said base.

23. The hanger of claim 12 including,
said support leg being an angle having angled surfaces shaped to conform to adjacent planar surfaces.

24. The hanger of claim 23 including,
at least one of said angled surfaces having openings therein corresponding to said bores.

25. The hanger of claim 12 including,
said support leg being tubular and shaped to receive said second portion of said stud.

26. The hanger of claim 25 including,
said tubular support leg being substantially square in cross-section.

27. The hanger of claim 26 including,
said tubular support leg having openings therein corresponding to said bores.

28. The hanger of claim 12 including, said support leg having openings therein corresponding to said bores.

29. The hanger of claim 12 including,
said support leg having openings therein corresponding to said bores,
a plurality of support legs, and
at least one tier fastened to adjacent support legs.

30. The hanger of claim 12 including,
said support leg having a plurality of openings sufficient to correspond to said bores,
at least one tier having an aperture positioned at each end thereof to correspond to an opening on each of adjacent support legs secured to adjacent studs.

31. The hanger of claim 12 including,
said support leg being an angle having angled surfaces shaped to conform to adjacent planar surfaces,
at least one of said angled surfaces having openings therein corresponding to said bores,
at least one tier having an aperture positioned at each end thereof to correspond to an opening on each of adjacent support legs secured to adjacent studs.

32. The hanger of claim 12 including,
said support leg being tubular and shaped to receive said second portion of said stud,
said tubular support leg being substantially square in cross-section,
said tubular support leg having openings therein corresponding to said bores, and
at least one tier having an aperture positioned at each end thereof to correspond to an opening on each of adjacent support legs secured to adjacent studs.

33. The method of supporting objects spaced from a metal structure comprising,
providing a stud having a cylindrical portion at one end forming a circular base and a welding flux thereon and at least one planar surface parallel to the axis of said stud,
end welding said circular base of said stud to said metal structure, and
securing a support leg having at least one planar surface to said stud at said stud planar surface.

34. The method of claim 33 including,
fastening a cross bar from one support leg to an adjacent support leg.

35. Th method of claim 33 including,
securing a support leg having a square tubular shape in cross-section.

36. The method of claim 33 including,
enclosing said stud with said support leg prior to securing said support leg.

37. The method of claim 33 including,
mating planar internal sides of said support leg with the planar surfaces of said stud prior to securing said support leg.

38. The method of claim 33 including,
mating planar internal sides of said support leg with the planar surfaces of said stud prior to securing said support leg,
enclosing said stud with said support leg prior to securing said support leg, and
securing said support leg and said stud by bolting.

39. An elongate weldable stud comprising a one-piece metal body having a weldable end and an outer end, said weldable end having a body of weld flux centrally located thereon and projecting outwardly therefrom, a weldable end portion of said stud having a circular transverse cross section, an outer end portion of said stud having a substantially square transverse cross section, said outer end portion having at least two parallel, longitudinally-spaced bores extending therethrough between opposite faces thereof, corners of said outer end portion being rounded throughout their length, the diameter of said weldable end portion of said stud being no greater than the distance between opposite faces of said outer end portion of said stud.

40. A weldable stud according to claim 39 wherein said weldable end portion is from about one-half to about two-thirds the total length of said stud.

41. A weldable stud according to claim 39 wherein said outer end portion is from about one-third to about one-half the total length of said stud.

42. A weldable stud according to claim 40 wherein said outer end portion is from about one-third to about one-half the total length of said stud.

43. In combination, an elongate weldable stud comprising a one-piece, metal body having a weldable end and an outer end, said weldable end having a body of weld flux centrally located thereon and projecting therefrom, a weldable end portion of said stud having a round transverse cross section and an outer end portion of said stud having a rectangular transverse cross section, and said outer end portion having at least two parallel, longitudinally-spaced bores extending therethrough between opposite faces of said outer end portion, an elongate metal element having mutually-perpendicular sides, at least one of said sides having uniformly-spaced holes therein, said outer end portion of said stud having rounded corners to enable said stud to fit more closely with said elongate element, and fasteners extending through two of said holes and through said two bores in said stud.

44. The combination according to claim 43 wherein each of said fasteners is a bolt having a head on one side of one of said sides and having a threaded shank projecting beyond the corresponding stud bore, and lock nut means affixed to said threaded shank on the side of said stud opposite said one of said sides.

45. The combination according to claim 43 wherein said rounded weldable end portion of said stud is from about one-half to about two-thirds of the total length of said stud.

46. The combination according to claim 43 wherein said outer end portion of said stud is from about one-third to about one-half the total length of said stud.

47. In combination, an elongate weldable stud for connecting an element of a support assembly for cables and pipes to a surface of a ship or submarine, said weldable stud comprising a one-piece metal body having a weldable end and an outer end, said weldable end having a solid body of weld flux centrally located thereon and projecting outwardly therefrom, a weldable end portion of said stud having a circular transverse cross section, an outer end portion of said stud having a square transverse cross section, the diameter of said weldable end portion of said stud not exceeding the distance between opposite faces of said outer end portion, said outer end portion having at least one bore extending transversely therethrough, an elongate element having mutually-perpendicular sides with equal inner widths, at least one of said sides having uniformly-spaced holes therein, and a fastener extending through one of said holes and through said bore in said stud.

48. The combination according to claim 47 wherein corners of said outer end portion are rounded.

49. The combination according to claim 47 wherein said outer end portion has two of said bores extending transversely therethrough in parallel, longitudinally-spaced relationship.

50. The combination according to claim 47 wherein said weldable end portion of said stud is from about one-half to about two-thirds of the total length of said stud.

51. The combination according to claim 47 wherein said outer end portion of said stud is from about one-third to about one-half of the total length of said stud.

52. The combination according to claim 47 wherein the widths of the faces of said outer end portion do not exceed the inner widths of the mutually-perpendicular sides of said elongate element.

53. In combination, an elongate weldable stud comprising a one-piece, metal body having a weldable end and an outer end, said weldable end having a body of weld flux centrally located thereon and projecting therefrom, a weldable end portion of said stud having a round transverse cross section and an outer end portion of said stud having a rectangular transverse cross section, and said outer end portion having at least two parallel, longitudinally-spaced bores extending therethrough between opposite faces of said outer end portion, two opposite faces of said outer end portion of said stud being spaced apart a distance substantially equal to the diameter of said weldable end portion of said stud, an elongate metal element having mutually-perpendicular sides, at least one of said sides having uniformly-spaced holes therein, and fasteners extending through two of said holes and through said two bores in said stud.

54. In combination, an elongate weldable stud comprising a one-piece, metal body having a weldable end and an outer end, said weldable end having a body of weld flux centrally located thereon and projecting therefrom, a weldable end portion of said stud having a round transverse cross section and an outer end portion of said stud having a rectangular transverse cross section, and said outer end portion having at least two parallel, longitudinally-spaced bores extending therethrough between opposite faces of said outer end portion, an elongate metal element having mutually-perpendicular sides, at least one of said sides having uniformly-spaced holes therein, the widths of the faces of said outer end portion not exceeding the inner widths of the mutually-perpendicular sides of said elongate element, the widths of said sides being equal and the widths of said faces of said outer end portions being equal, and fasteners extending through two of said holes and through said two bores in said stud.

55. An elongate weldable stud comprising a one-piece metal body having a weldable end and an outer end, said weldable end having a body of weld flux centrally located thereon and projecting outwardly therefrom, a weldable end portion of said stud having a circular transverse cross section, an outer end portion of said stud having a substantially square transverse cross section, said outer end portion having at least one bore extending transversely therethrough between opposite faces thereof, corners of said outer end portion being rounded throughout their length, the diameter of said weldable end portion of said stud being no greater than the distance between opposite faces of said outer end portion of said stud.

56. An elongate weldable stud comprising a one-piece metal body having a weldable end and an outer end, said weldable end having a body of weld flux centrally located thereon and projecting outwardly therefrom, a weldable end portion of said stud having a circular transverse cross section, an outer end portion of said stud having a substantially square transverse cross section, said stud having at least two parallel, longitudinally-spaced bores extending transversely therethrough perpendicular to opposite faces of said outer end portion, corners of said outer end portion being rounded throughout their length, the diameter of said weldable end portion of said stud being no greater than the distance between opposite faces of said outer end portion of said stud.

57. An elongate weldable stud comprising a one-piece metal body having a weldable end and an outer end, said weldable end having a body of weld flux centrally located thereon and projecting outwardly therefrom, a weldable end portion of said stud having a circular transverse cross section, an outer end portion of said stud having a substantially square transverse cross section, said outer end portion having at least two longitudinally-spaced bores extending transversely therethrough between opposite faces thereof, corners of said outer end portion being rounded throughout their length.

* * * * *